(12) United States Patent
Rao et al.

(10) Patent No.: US 9,278,720 B2
(45) Date of Patent: Mar. 8, 2016

(54) AERODYNAMIC DRAG REDUCING APPARATUS

(71) Applicant: MAVEN INNOVATIVE TECHNOLOGIES LTD, Hatfield Hertfordshire (GB)

(72) Inventors: Vasu Rao, Hatfield (GB); Rakesh Sinha, Hatfield (GB)

(73) Assignee: Maven Innovative Technologies Ltd., Hatfield Hertfordshire (GB)

( * ) Notice: Subject to any disclaimer, the term of this patent is extended or adjusted under 35 U.S.C. 154(b) by 0 days.

(21) Appl. No.: 14/394,390

(22) PCT Filed: Apr. 9, 2013

(86) PCT No.: PCT/GB2013/050909
§ 371 (c)(1),
(2) Date: Oct. 14, 2014

(87) PCT Pub. No.: WO2013/156755
PCT Pub. Date: Oct. 24, 2013

(65) Prior Publication Data
US 2015/0035311 A1  Feb. 5, 2015

(30) Foreign Application Priority Data
Apr. 17, 2012 (GB) .................................. 1206754.2

(51) Int. Cl.
*B62D 35/00* (2006.01)
(52) U.S. Cl.
CPC .................................... *B62D 35/001* (2013.01)
(58) Field of Classification Search
CPC ........ B62D 35/00; B62D 35/01; B62D 35/02; B62D 35/05; B62D 35/08; B62D 35/001
USPC ....................... 296/180.1–180.5; 105/1.1, 1.3
See application file for complete search history.

(56) References Cited

U.S. PATENT DOCUMENTS

| 2,146,297 | A |   | 2/1939 | Huet |
|---|---|---|---|---|
| 3,823,968 | A | * | 7/1974 | Barenyi ........................ 293/131 |
| 3,879,866 | A | * | 4/1975 | Gunderson ...................... 37/260 |
| 4,095,835 | A | * | 6/1978 | Ensor ......................... 296/180.3 |
| 4,102,548 | A | * | 7/1978 | Kangas ....................... 296/180.3 |
| 4,401,339 | A |   | 8/1983 | Rios |
| 2012/0139290 | A1 | * | 6/2012 | Kenevan .................... 296/180.3 |

FOREIGN PATENT DOCUMENTS

JP      2009 132361 A    6/2009

* cited by examiner

*Primary Examiner* — Dennis H Pedder
(74) *Attorney, Agent, or Firm* — Whitham, Curtis, Christofferson & Cook, P.C.

(57) ABSTRACT

A substantially flat fronted vehicle (10) such as a truck is provided with adjustable air deflector blades (24A-24D). The air deflector blades (24A-24D) provide upper (24A 24C) and lower (24B 24D) air deflector blades vertically mounted above one another and providing a gap (32) around the windscreen (8). The air deflector blades (24A-24D) are arcuate sheets in form and each supported by support arms (26) comprising vertically hinged first (38) and second (40) connected spring loaded arms that are urged to spring open but are held a selected angle and distance from the vehicle (10) front face (22) by wire rope length selection means and are thusly adjusted to promote least aerodynamic drag. Use on rail vehicles is also included. The apparatus has the unexpected effect of actually reducing forward vehicle aerodynamic drag in the presence of crosswinds.

15 Claims, 3 Drawing Sheets

AERODYNAMIC DRAG REDUCING APPARATUS

The present invention relates to an apparatus that can be attached to a vehicle to reduce its aerodynamic wind resistance, thereby saving fuel. It particularly relates to an apparatus that can counter increased air drag present in cross winds.

Most of the vehicles, for example trucks and buses, usually have a flat front or a slightly rounded front face. Such a flat front face creates higher air resistance than conventionally shaped vehicles when a flat fronted vehicle cruises at speed. Aerodynamic resistance is roughly proportional to the square of the air velocity relative to the vehicle. Higher aerodynamic resistance increases the fuel consumption due to increased engine output required. Also, flat and metallic front face causes more damage during crash. The present invention seeks to reduce aerodynamic drag for flat fronted vehicles.

When a vehicle encounters crosswinds, its forward drag increases and even more fuel is used. The present invention seeks to prevent increased vehicle forward motion aerodynamic resistance when encountering crosswinds.

Manufacture of aerodynamically corrected vehicles is costly, and additional streamlining parts obstruct parking thereby reducing the number of vehicles that can be parked in an area and limiting possible delivery access for parking, loading and unloading. The present invention seeks to provide a low cost solution to reducing vehicle aerodynamic drag that does not obstruct parking or reduce loading or unloading access.

When a flat fronted vehicle crashes, crumple zones at the vehicle front are limited or absent. This renders flat fronted vehicles less safe for drivers and passengers, increasing the likelihood of injury or death. The present invention seeks to provide a vehicle front structure that serves as a crumple zone.

According to a first aspect, the present invention consists in an apparatus for reducing aerodynamic drag experienced by a substantially flat fronted vehicle, the apparatus comprising: at least one left hand air deflector blade adapted to be attached to the left hand side of the front face of the vehicle by an adjustment mechanism; and at least one right hand air deflector blade adapted to be attached to the right hand side of the front face of the vehicle by the adjustment mechanism; where, the right hand and left hand air deflector blades are each adapted to extend substantially the height of the vehicle; the apparatus further comprising an adjustment mechanism attachable to the front face of the vehicle, the adjustment mechanism being adjustable to cause the left hand and right hand air defector blades to be positioned at a selectable angle to and at a selectable distance from the front face of the vehicle to reduce aerodynamic drag when the vehicle is in motion.

According to a second aspect, the present invention consists in a vehicle including an apparatus for reducing aerodynamic drag experienced by a substantially flat fronted vehicle, the apparatus comprising: at least one left hand air deflector blade adapted to be attached to the left hand side of the front face of the vehicle by an adjustment mechanism; and at least one right hand air deflector blade adapted to be attached to the right hand side of the front face of the vehicle by the adjustment mechanism; where, the right hand and left hand air deflector blades are each adapted to extend substantially the height of the vehicle; the vehicle further comprising an adjustment mechanism attached to the front face of the vehicle, the adjustment mechanism being adjustable to cause the left hand and right hand air defector blades to be positioned at a selectable angle to and at a selectable distance from the front face of the vehicle to reduce aerodynamic drag when the vehicle is in motion.

The invention also provides that the adjustment mechanism can be operable to position the air deflector blades in fixed selectable positions.

The invention also provides that the adjustment mechanism can comprise: first and second arms; a proximal end of the first arm being adapted to be pivotally mounted onto the face of the vehicle; a distal end of the first arm being pivotally mounted to the proximal end of the second arm; and the second arm being attached to a respective air deflector blade.

The invention also provides that the adjustment mechanism for each air deflector blade can comprise at least two sets of first and second arms adapted to lie vertically above one another, adapted to move in common, and adapted to be positioned in common.

The invention also provides for use where the vehicle has a windscreen, where: the right hand air deflector blade comprise an upper right hand air deflector blade and a lower right hand air deflector blade; the upper and lower right hand air deflector blades can be mountable vertically substantially one above the other with a vertical gap there between to avoid obscuring the right hand side of the windscreen; the left hand air deflector blade can comprise an upper left hand air deflector blade and a lower left hand air deflector blade; and the upper and lower left hand air deflector blades are mountable vertically substantially one above the other with a vertical gap there between to avoid obscuring the left hand side of the windscreen.

The invention also provides that the adjustment mechanism can comprise a hinge at each pivotal mounting point; and the adjustment mechanism can comprise arm angle adjustment means.

The invention also provides that the arm angle adjustment means can comprise; at least one spring acting at each pivotal mounting point to urge the arms to assume a fully open position; wire rope attached to the arms; and wire rope length adjustment means operable, when attached to the vehicle, to adjust the length of the wire rope between the arms and the front of the vehicle against the urging imparted by the springs.

The invention also provides that the arm angle adjustment means can comprise at least one of: hydraulic actuation; stepper motor actuation of arms about hinges; and use of screw, nut and bolt fixing to fix the air deflector blades in fixed positions.

The invention also provides for use where the vehicle can be one of: a van; a panel truck; a fire engine; a bus; an articulated goods vehicle; a non-articulated (rigid framed) goods vehicle; and a railway locomotive.

'The invention also provides for comprising servo adjustment means based on suitable computer software, operable to accept continuously fuel usage, distance travelled and prevailing wind condition information from appropriate transducers fitted to vehicle, in order to adjust the positions of the air deflector blades to minimize aerodynamic drag.

The invention is further explained, by way of an example, by the following description to be read in conjunction with the appended drawings, in which.

Figure 1:
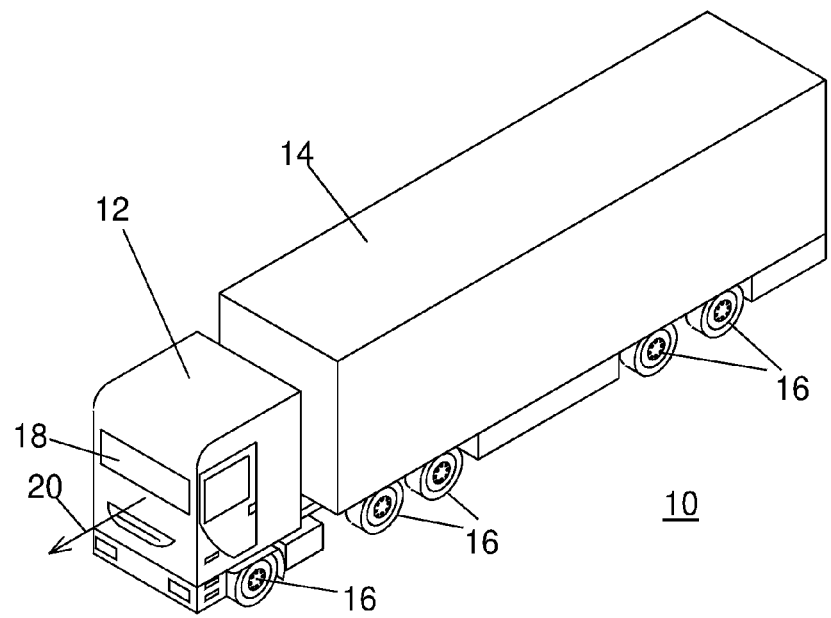
FIG. 1 is an exemplary isometric view of a vehicle to which the aerodynamic drag reducing apparatus can be attached.

A vehicle 10 comprises a cab 12 for occupation by a driver that rides ahead of a trailer 14 where merchandise is stowed and transported. A plurality of wheels 16 support the vehicle 10. The cab 12 has a windscreen 18 through which the driver can see the road to control and steer the vehicle 10. When in motion, the vehicle 10 moves forward as indicated by forward movement arrow 20.

The vehicle shown in FIG. 1 is an articulated lorry (called a semi in North America). This is shown by way of an example only. The vehicle upon which the apparatus is employed can be any kind of substantially flat fronted vehicle including, but not limited to: vans; panel trucks; fire engines; busses; articulated goods vehicles; non-articulated (rigid framed) goods vehicles; and railway locomotives. The apparatus can also be beneficially applied to vehicle comprising a cab 12 and two or more trailers.

Figure 2:
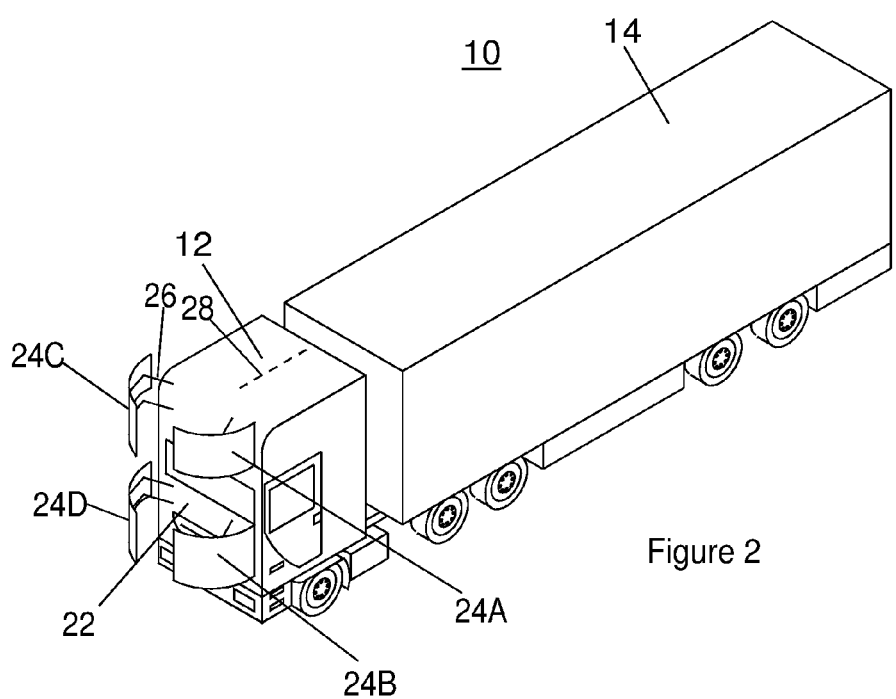
FIG. 2 shows the vehicle of FIG. 1 with aerodynamic drag reducing apparatus attached.

Attention is next drawn to FIG. 2 showing the vehicle of FIG. 1 with aerodynamic drag reducing apparatus attached. The vehicle front 22 has attached thereto four air deflector blades 24A-24D each adjustably spaced from and angled relative to the vehicle front 22 by adjustable spring loaded support arms 26 (only one set of which is indicated in FIG. 2).

The support arms 26 are attached at a proximal end to the vehicle front 22 and at a distal end to their respective air deflector blade 24A-24D. As will become clear from the description given hereafter, the air deflector blades 24A-24D are adjustable to give an optimal or acceptable aerodynamic air resistance reduction when the vehicle 10 is moving in the direction of forward movement arrow 20 of FIG. 1.

In the example shown, the upper air deflector blades 24A 24C are vertically above their respective lower air deflector blades 24B 24D and spaced symmetrically on either side if the cab centre line 28 shown in broken line format. It is to be appreciated that the apparatus can be employed with upper air deflector blades 24A 24C out of vertical alignment with their respective lower air deflector blades 24B 24D and out of symmetry about the central line 28 of the cab 12.

The air deflector blades 24A-24D are arranged above and below the windscreen 18 to keep the driver's view unobstructed and to permit the vehicle 10 windscreen wipers (not shown) and windscreen washers (also not shown) to be used.

Figure 3:
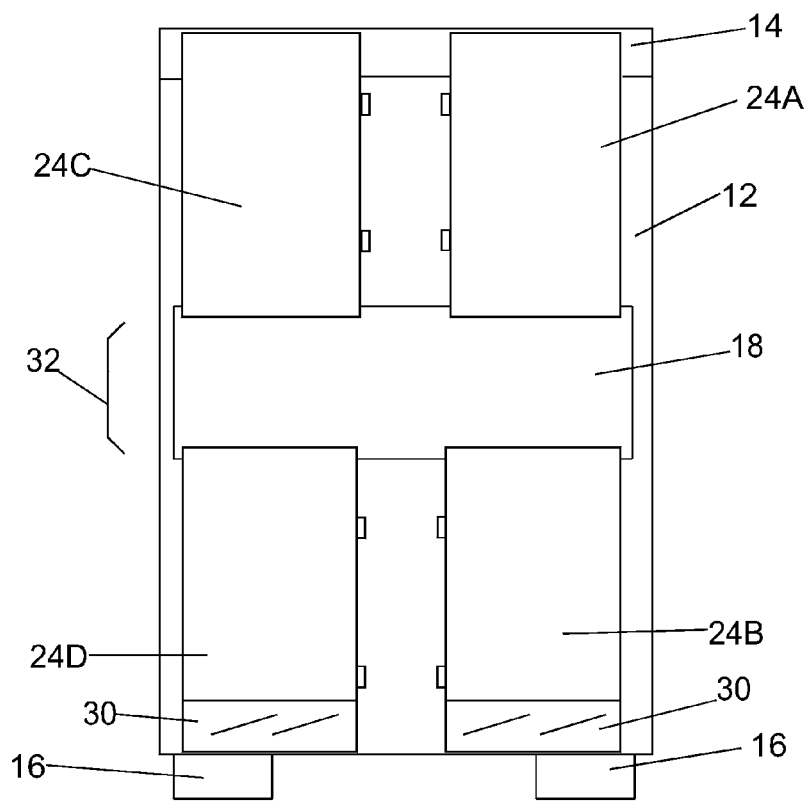
FIG. 3 shows a font view of the vehicle of FIG. 2 with air deflector blades in place.

Attention is next drawn to FIG. 3 showing a front view of the vehicle 10 of FIG. 2 with air deflector blades 24A-24D in place. The air deflector blades 24A-24D are provided extending substantially from the height of the top of the trailer 14 to the height of the bottom of the front face 22 of the cab 12 beneath which the wheels 16 are shown protruding in part. Transparent portions 30 in the air deflector blades 24B 24D allow vehicle lights to be visible. The air deflector blades 24A-24D leave a vertical gap 32 in the vicinity or the windscreen 18 to prevent the view of a driver from being obscured.

Figure 4:
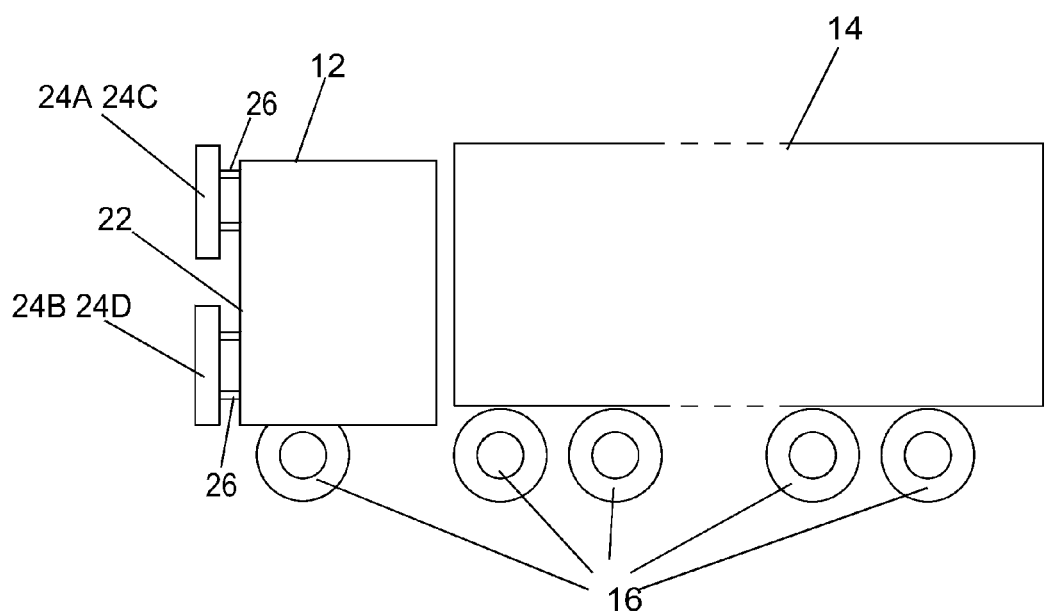
FIG. 4 shows a sides view of the vehicle of FIGS. 2 and 3.

Attention is next drawn to FIG. 4 showing a side view of the vehicle 10 of FIGS. 2 and 3. The air deflector blades 24A-24D are supported ahead of the vehicle front face 22 by the support arms 26.

Figure 5:
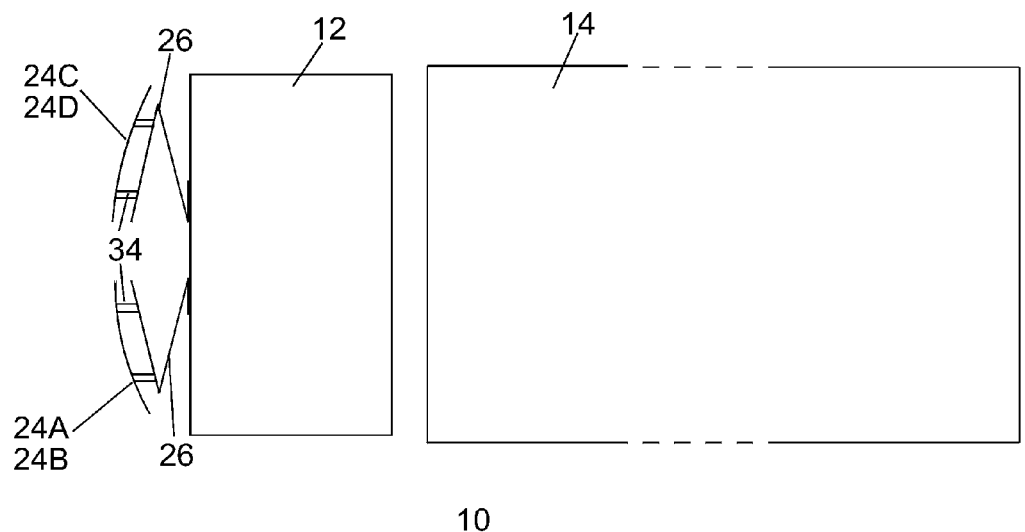
FIG. 5 shows a view from above of the vehicle shown in FIGS. 2, 3 and 4.

Attention is next drawn to FIG. 5 showing a view from above of the vehicle shown in FIGS. 2, 3 and 4. FIG. 5 makes clearer that the air deflector blades 24A-24D are in the shape of an arcuate curve when viewed from above and supported by support extensions 34 attached to the support arms 26.

Figure 6:
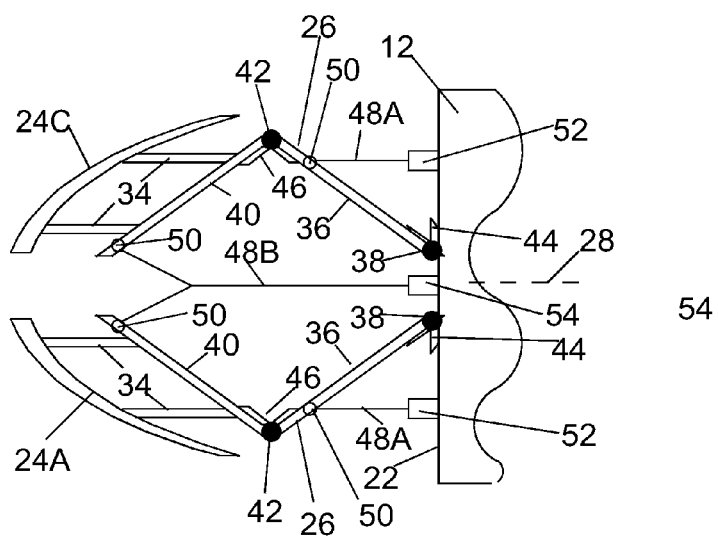
FIG. 6 shows an enlarged view of the left hand portion of FIG. 5 and gives a detailed view of an exemplary deflector blade 24A-24D Attention is first drawn to FIG. 1 showing an exemplary isometric view of a vehicle to which the aerodynamic drag reducing apparatus can be attached.

Attention is next drawn to FIG. 6, showing an enlarged view of the left hand portion of FIG. 5 and provides a detailed view of an exemplary deflector blade 24A-24D adjustment mechanism.

Each support arm 26 comprises a first arm 36 that is attached to the vehicle front face 22 by a first horizontal hinge 38. The distal end of the first arm 36 is attached to a proximal end of a second arm 40 at a second horizontal hinge 42. The support extensions 34 extend horizontally from the second arms 40 to hold the air deflector blades 24A-24D. First springs 42 at the first horizontal hinges 38 rotationally urge the distal end of the first arms 36 to move away from the cab centre line 28. Second springs 46 at the second horizontal hinges 42 rotationally urge the second arms 30 to become aligned with the first arms 36.

Wire ropes 48A 48B are attached to the arms by swivel couplings 50 to the arms 36 40. The length of edge wire ropes 48A is adjusted by an edge adjustment mechanism 52 two of which are shown proximate to the edge of the front face 22 of the cab 12. The length of a central wire rope 48B, attached in common to second arms 40 on either side of the cab centre line 28 is adjusted by a central adjustment mechanism 54.

The edge wire rope 48A lengths and the central wire rope 48B lengths can be separately adjusted to configure the air deflector blades 24A-24D at selectable angles and selectable edge and central distances from the vehicle front face 22.

Standard structural components for the arms 36 40 and hinges 38 42 are used. The mechanism is designed for adequate strength and rigidity, keeping the weight as low as possible. The mechanism is operated by wire ropes and appropriate two pulley-operating stepper motors (not shown). The arms 36 40 take up extended position due to the in-built springs 44 46. The stepper motors pull in the arms by amounts required against the spring force to position the air deflector blades 24A-24D at optimum positions.

It is to be appreciated that although FIG. 6 shows the adjustment arrangement for the upper part of just two horizontally adjacent deflector blades 24A and 24C, that each air deflector blade 24A and 24C comprises two vertically separated adjustment arrangements and that the vehicle 10 has a total of eight such adjustment arrangements.

It is also to be appreciated that any other air deflector blade 24A-24D positioning system can also be employed within the invention, including, but not limited to: hydraulic actuation; stepper motor actuation of arms 36 40 about hinges 38 42; and use of screw, nut and bolt fixing to fix the air deflector blades 24A-24D in fixed positions.

The aerodynamic performance of a road vehicle 10 is improved by installing the specially shaped air deflector blades 24A-24D in the front of a vehicle 10. In use, air deflector blades 24A-24D are removeably attached to the vehicle front face 22 and the location and orientation of the air deflector blades 24A-24D adjusted to optimise the aerodynamic performance. The air deflector blades 24A-24D may be installed on any vehicle 10 with minimum structural modifications. The invention offers the technical improvement of providing adjustable, easily attached, easily removed and easily folded for stowing apparatus that provides shaping and modification to a vehicle 10 front 22. The air deflector blades 24A-24D do not form any integral part of the vehicle 10 body surface.

The invention also offers the technical improvement of providing reduction of aerodynamic drag force opposing the vehicle 10 motion, when there is a cross wind. This occurs due to the lift force generated by the air deflector blades in cross wind condition, which is a novel exploitation of cross wind. Usually, for flat fronted vehicles, crosswinds causes additional aerodynamic resistance.

The use of air deflector blades 24A-24D with positioning that was adjusted for optimum by finding what adjustment minimized aerodynamic drag was run on Computational Fluid Dynamics (CFD) Analysis that shows that drag reductions are possible. The computed data is shown in Table-1 below where percent changes in aerodynamic resistance, compared to the flat fronted vehicle moving in air with no cross-wind, are given.

TABLE 1

Action of air deflector blades 24A-24D for typical vehicle motion and cross-wind

| Relative Wind Direction with Respect to Vehicle | Percent Change of Drag for Flat Fronted Vehicle | Percent Change of Drag for Vehicle with Fitted Air Deflector Blades |
| --- | --- | --- |
| In line with vehicle direction of motion | 0% | −30% |
| 10 degrees to vehicle direction of motion | +7.7% | −37.4% |
| 20 degrees to vehicle direction of motion | +33.9% | −41.9% |

The data presented in Table 1 is for a typical flat fronted vehicle moving at a speed of 20 m/s, with optimised location of air deflector blades 24A-24D. The actual magnitudes will depend on the detailed geometry of the vehicle, its speed and prevailing wind conditions. The magnitudes of percent changes will not far differ from those given in Table 1.

The air deflector blades 24A-24D can be provided with additional supportive and/or strengthening layers to offer additional crash absorption "crumple zone" features lacking in a flat fronted vehicle 10 without detracting from their aerodynamic drag reduction ability.

The air deflector blades 24A-24D provide a so-called "Green" improvement by reducing carbon emission and carbon footprint of flat fronted vehicles by lowering engine output power required for movement.

Inclusion of air deflector blades 24A-24D can be as an addition to a pre-existing vehicle 10, or can be a permanent feature by being part of an initial vehicle manufacturer's design.

The invention provides that air deflector blades 24A-24D may be fixed in an optimum position on a vehicle for the most common cruising conditions. As an alternative, the invention also provides that the air deflector blades 24A-24D may be continuously adjusted based on vehicle speed and cross wind condition to give least aerodynamic resistance for prevailing conditions. Adjustment can be made based on data retrieved from a table of predetermined results, or a feedback mechanism can be employed to adjust the positions of air deflector blades 24A-24D using the adjustment mechanisms 52 54 to achieve minimum detected fuel consumption at a particular speed (liters per kilometer, for example, as measured by a combination of measured fuel flow and odometer output) in real time.

The size of air deflector blades 24A-24D can be selected for different sizes of vehicle, and the location and shape of air deflector blades 24A-24D can be adapted and be adjusted for given vehicle 10 height and width.

Materials for the air deflector blades 24C-24D are selected to provide adequate strength and weather-proof qualities, while minimising the weight. The air deflector blade 24A-24D material need not be transparent as the air deflector blades 24A-24D do not obscure vehicle driver's vision. It is preferred that air deflector blades 24A-24D include transparent window portions 30 where required for vehicle lights to be visible.

It is of note that the invention provides the further advantage that air deflector blades 24A-24D do not obstruct air flow through the radiator of the vehicle.

The invention is further explained and defined by the following appended Claims.

The invention claimed is:

1. An apparatus for reducing aerodynamic drag experienced by a substantially flat fronted vehicle, the apparatus comprising:
   an upper left hand air deflector blade and a lower left hand air deflector blade which are mountable vertically substantially one above the other with a vertical gap therebetween to a left hand side of a front face of the vehicle, wherein said upper left hand air deflector blade and said lower left hand deflector blade cover portions of the substantially flat front of the vehicle above and below a windscreen of the vehicle;
   an upper right hand air deflector blade and a lower right hand air deflector blade which are mountable vertically substantially one above the other with a vertical gap therebetween to a right hand side of the front face of the vehicle, wherein said upper right hand air deflector blade and said lower right hand deflector blade cover portions of the substantially flat front of the vehicle above and below the windscreen of the vehicle; and
   an adjustment mechanism attachable to the front face of the vehicle and configured to attach the upper left hand air deflector blade, the lower left hand air deflector blade, the upper right hand deflector blade, and the lower right hand air deflector blade to the front face of the vehicle, wherein when attached to the front face of the vehicle, the adjustment mechanism is adjustable to cause the upper left hand air deflector blade, the lower left hand air deflector blade, the upper right hand deflector blade, and the lower right hand air defector blade to be positioned at a selectable angle to and at a selectable distance from the front face of the vehicle to reduce aerodynamic drag when the vehicle is in motion.

2. The apparatus according to claim 1 wherein the adjustment mechanism is operable to position the air deflector blades in fixed selectable positions.

3. The apparatus according to claim 1 wherein the adjustment mechanism comprises:
   first and second arms;
   a proximal end of the first arm being adapted to be pivotally mounted onto the face of the vehicle;
   a distal end of the first arm being pivotally mounted to the proximal end of the second arm; and
   the second arm being attached to a respective air deflector blade.

4. The apparatus of claim 3 wherein the adjustment mechanism comprises two sets of said first and second arms adapted to lie vertically above one another, adapted to move in common, and adapted to be positioned in common.

5. The apparatus according to claim 1, wherein:
   the upper and lower right hand air deflector blades are adapted to together with the vertical gap extend substantially the height of the vehicle;
   the upper and lower left hand air deflector blades are adapted to together with the vertical gap extend substantially the height of the vehicle; and the vertical gap between the upper and lower right hand air deflector blades and the vertical gap between the upper and lower left hand air deflector blades are adjusted in a manner to provide unobstructed front and side vision to right and left sides of the windscreen, respectively.

6. The apparatus according to claim 3, wherein:
the adjustment mechanism comprises a hinge at each pivotal mounting point; and
the adjustment mechanism comprises arm angle adjustment means.

7. The apparatus according to claim 6 wherein the arm angle adjustment means comprises:
a spring acting at each pivotal mounting point to urge the arms to assume a fully open position;
wire rope attached to the arms; and
wire rope length adjustment means operable, when attached to the vehicle, to adjust a length of the wire rope between the arms and the front face of the vehicle against the urging imparted by the springs.

8. A substantially flat fronted vehicle comprising an apparatus for reducing aerodynamic drag experienced by the vehicle, the apparatus comprising:
an upper left hand air deflector blade and a lower left hand air deflector blade which are mountable vertically substantially one above the other with a vertical gap therebetween to a left hand side of a front face of the vehicle, wherein said upper left hand air deflector blade and said lower left hand deflector blade cover portions of the substantially flat front of the vehicle above and below a windscreen of the vehicle;
an upper right hand air deflector blade and a lower right hand air deflector blade which are mountable vertically substantially one above the other with a vertical gap therebetween to a right hand side of the front face of the vehicle, wherein said upper right hand air deflector blade and said lower right hand deflector blade cover portions of the substantially flat front of the vehicle above and below the windscreen of the vehicle; and
an adjustment mechanism attachable to the front face of the vehicle and configured to attach the upper left hand air deflector blade, the lower left hand air deflector blade, the upper right hand deflector blade, and the lower right hand air deflector blade to the front face of the vehicle, wherein when attached to the front face of the vehicle, the adjustment mechanism is adjustable to cause the upper left hand air deflector blade, the lower left hand air deflector blade, the upper right hand deflector blade, and the lower right hand air defector blade to be positioned at a selectable angle to and at a selectable distance from the front face of the vehicle to reduce aerodynamic drag when the vehicle is in motion.

9. The vehicle according to claim 8 wherein the adjustment mechanism is operable to position the air deflector blades in fixed selectable positions.

10. The vehicle according to claim 8 wherein the adjustment mechanism comprises:
first and second arms;
a proximal end of the first arm being adapted to be pivotally mounted onto the face of the vehicle;
a distal end of the first arm being pivotally mounted to the proximal end of the second arm; and
the second arm being attached to a respective air deflector blade.

11. The vehicle of claim 10 wherein the adjustment mechanism comprises two sets of first and second arms adapted to lie vertically above one another, adapted to move in common, and adapted to be positioned in common.

12. The vehicle according to claim 8, wherein:
the upper and lower right hand air deflector blades are adapted to together with the vertical gap extend substantially the height of the vehicle;
the upper and lower left hand air deflector blades are adapted to together with the vertical gap extend substantially the height of the vehicle; and
the vertical gap between the upper and lower right hand air deflector blades and the vertical gap between the upper and lower left hand air deflector blades are adjusted in a manner to provide unobstructed front and side vision to right and left sides of the windscreen, respectively.

13. The vehicle according to claim 10, wherein:
the adjustment mechanism comprises a hinge at each pivotal mounting point; and
the adjustment mechanism comprises arm angle adjustment means.

14. The vehicle according to claim 13 wherein the arm angle adjustment means comprises;
a spring acting at each pivotal mounting point to urge the arms to assume a fully open position;
wire rope attached to the arms; and
wire rope length adjustment means operable to adjust a length of the wire rope between the arms and the front face of the vehicle against the urging imparted by the springs.

15. The vehicle of claim 8 wherein said vehicle is a self-propelled vehicle.

* * * * *